United States Patent [19]

Ishiguro

[11] Patent Number: 4,478,500
[45] Date of Patent: Oct. 23, 1984

[54] EXPOSURE CONTROLLING DEVICE ADAPTED TO CAMERAS USING INTERCHANGEABLE LENSES

[75] Inventor: Yasuo Ishiguro, Tokyo, Japan

[73] Assignees: Copal Company Limited; Konishiroku Photo Industry Co., Ltd., both of Tokyo, Japan; a part interest

[21] Appl. No.: 348,744

[22] Filed: Feb. 16, 1982

Related U.S. Application Data

[63] Continuation of Ser. No. 185,444, Sep. 9, 1980, abandoned.

[30] Foreign Application Priority Data

Sep. 14, 1979 [JP] Japan .............................. 54-118142

[51] Int. Cl.³ .............................................. G03B 7/08
[52] U.S. Cl. ................................................... 354/443
[58] Field of Search .................... 354/23 D, 29, 36, 37, 354/38, 40–44, 60 R, 60 E, 289

[56] References Cited

U.S. PATENT DOCUMENTS

| | | | |
|---|---|---|---|
| 3,603,799 | 9/1971 | Nobusawa | 354/23 D |
| 3,950,765 | 4/1976 | Nanba et al. | 354/38 |
| 3,964,073 | 6/1976 | Kobori et al. | 354/38 |
| 4,054,887 | 10/1977 | Holle et al. | 354/43 |
| 4,074,289 | 2/1978 | Nobusawa | 354/23 D |
| 4,129,366 | 12/1978 | Watanabe | 354/51 |
| 4,204,755 | 5/1980 | Toyoda et al. | 354/60 E |
| 4,213,682 | 7/1980 | Yamada | 354/38 |
| 4,262,282 | 4/1981 | Maida | 354/23 D |
| 4,307,948 | 12/1981 | Kitamura et al. | 354/43 |
| 4,324,467 | 4/1982 | Shiozawa | 354/38 |
| 4,385,819 | 5/1983 | Toyoda et al. | 354/42 |

*Primary Examiner*—Russell E. Adams
*Attorney, Agent, or Firm*—Cushman, Darby & Cushman

[57] ABSTRACT

An exposure controlling device comprising a means of discriminating to what zone of exposure zones sectioned in advance an exposure value determined by considering the brightness information of an object to be photographed obtained by a TTL light measurement under the maximum diaphragm aperture and the film sensitivity of the film to be used belongs, a means of determining a diaphragm value simultaneously with and in response to the discrimination of the exposure zone and a means of comparing the determined diaphragm value with the F-number of a photographing lens to be used and controlling a proper exposure time corresponding to said diaphragm value so that a diaphragm aperture and shutter speed for obtaining a proper exposure can be automatically set without making any special switching operation even in the case of using any photographing lens different in the F-number. The means of determining the diaphragm value includes a member which can be intermittently driven by a pulse signal. By the initial motion of this member, a mirror mechanism or automatic focus adjusting device can be released.

3 Claims, 6 Drawing Figures

EXPOSURE CONTROLLING DEVICE ADAPTED TO CAMERAS USING INTERCHANGEABLE LENSES

This is a continuation of application Ser. No. 185,444 filed Sept. 9, 1980, now abandoned.

BACKGROUND OF THE INVENTION (a) Field of the Invention

This invention relates to exposure controlling device for cameras and more particularly to a program exposure controlling device by a TTL light measurement adapted to cameras of a type using interchangeable photographing lenses.

(b) Description of the Prior Art

There is already known a camera which can use interchangeable photographing lenses and of a type in which a TTL light measurement is made under the maximum diaphragm aperture and, on the basis of the result, a combination of a proper diaphragm aperture and shutter speed (exposure time) can be programmatically controlled. However, according to the conventional exposure controlling system adapted to this kind of camera, the range of selection of diaphragm values to be controlled is so wide that here have been defects that the entire controlling mechanism will be complicated and, as a result, the camera can not help becoming expensive.

SUMMARY OF THE INVENTION

Therefore, a primary object of the present invention is to provide an exposure controlling device of the above mentioned type which is simple in the mechanism and can be made comparatively cheaply.

According to the present invention, this object is attained by forming an exposure controlling device so that to what zone of a plurality of exposure zones set in advance an exposure value based on the brightness information of an object to be photographed having the TTL light measured belongs is discriminated, one diaphragm value belonging to an exposure zone selected simultaneously with this discrimination is automatically determined and the thus determined diaphragm value is compared with the F-number of a lens to be used to determine a proper shutter speed (exposure time).

According to the exposure controlling device of the present invention, in case an object to be photographed is dark, a photographing lens can be always used with its maximum diaphragm aperture.

Another object of the present invention is to provide an exposure controlling device wherein an exposure zone can be discriminated or a diaphragm value can be determined by intermittently driving an electromagnetic device with a pulse signal and, in the initial step of said intermittent driving, such preactuating means as a mirror mechanism and automatic focus adjusting mechanism can be released.

These and other objects of the present invention will become more apparent from the following detailed description and appended claims.

DESCRIPTION OF THE PREFERRED EMBODIMENTS

Figure 1:
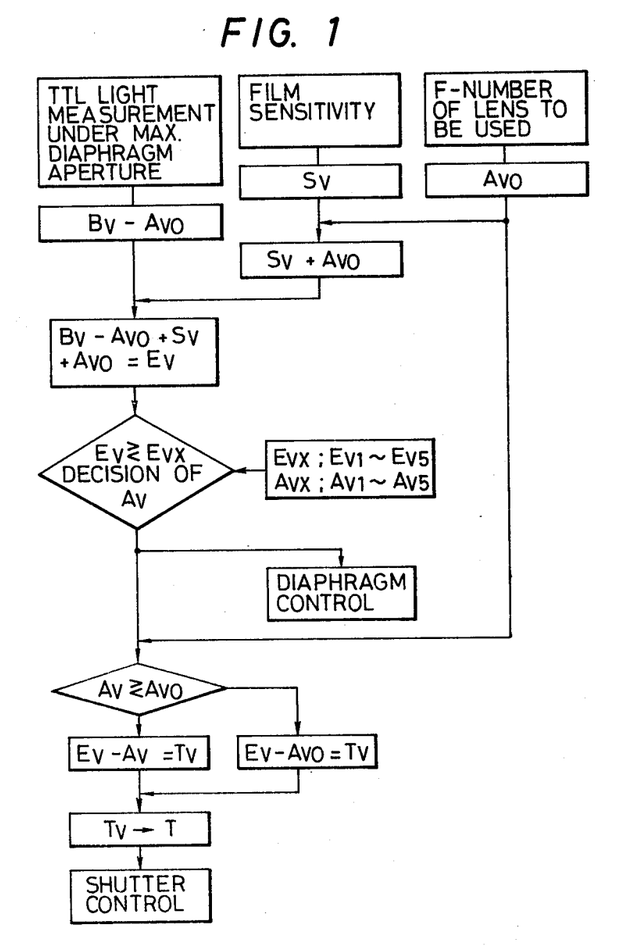
FIG. 1 is an explanatory view for explaining the controlling device according to the present invention.

First, the fundamental principle of the present invention shall be explaned with reference to FIG. 1.

The brightness Bv of an object to be photographed is measured (TTL light measurement) and is operated by considering the film sensitivity Sv of a film to be used and the F-number Avo of a mounted lens to determine an exposure value Ev.

$$Bv - Avo + Sv + Avo = Bv + Sv = Ev.$$

To what zone of exposure zones (for example, five steps of Ev1 to Ev5) set as divided into several steps in advance an exposure value Ev different every light measuring time belongs is discriminated and a diaphragm aperture value Avx (Av1 to Av5) corresponding to the zone is determined. On the other hand, the diaphragm aperture value Avx is compared with the F-number Avo of the mounted lens. An exposure time Tx (shutter speed) is determined on the basis of a time value Tvx obtained by Evx−Avx in case the diaphragm aperture value Avx is smaller than the F-number Avo or by Evx−Avo in the reverse case.

Figure 2:
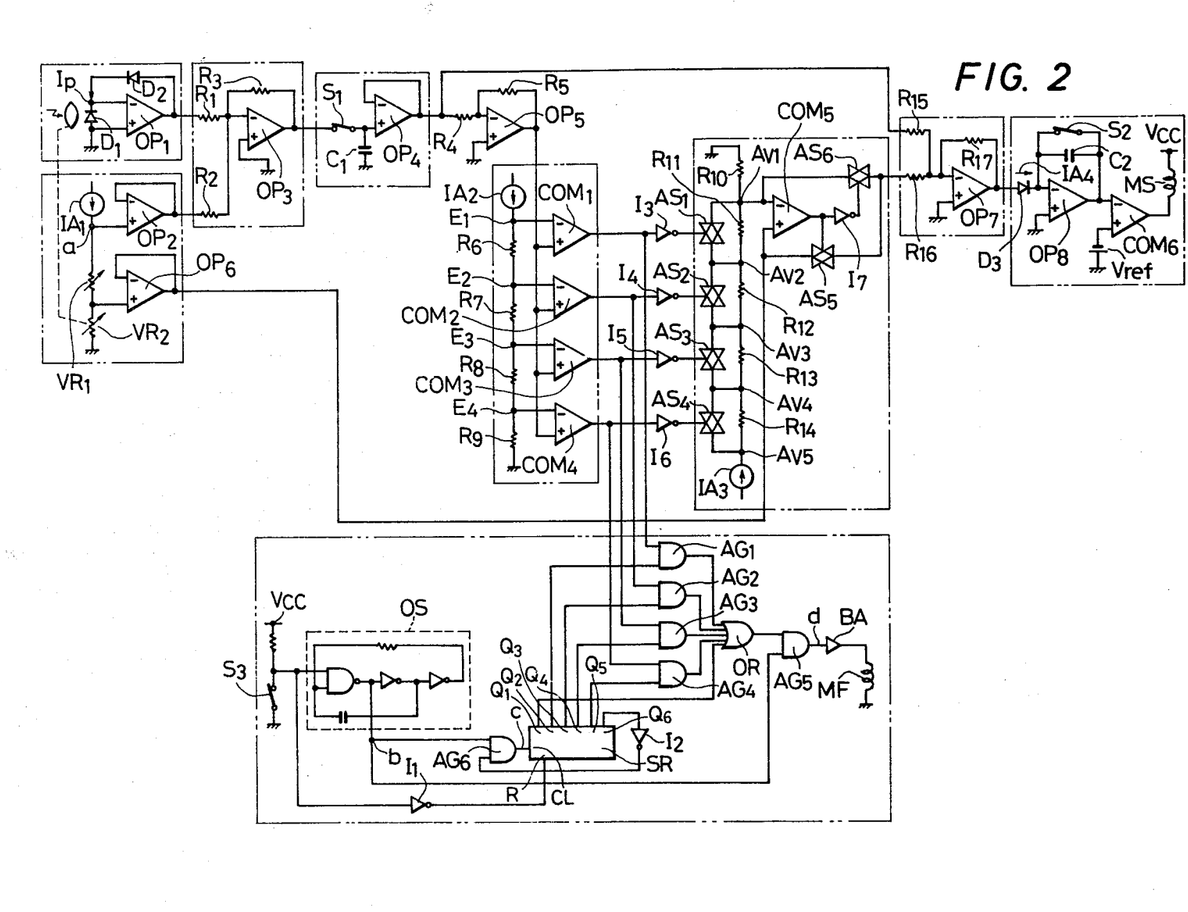
FIG. 2 is a wiring diagram showing an embodiment of the controlling circuit according to the present invention.

Now, an embodiment of the device of the present invention shall be explained in detail with reference to FIG. 2.

Symbol $D_1$ denotes a photodiode, $D_2$ denotes a logarithmic compression diode and $D_3$ denotes a logarithmic extension diode. $VR_1$ denotes a variable resistor for setting the film sensitivity information and $VR_2$ denotes a variable resistor for setting the F-number information of the mounted lens. $C_1$ denotes a capacitor for memorization and $C_2$ denotes a capacitor for reproduction. $S_1$ denotes a switch for memorization, $S_2$ denotes a switch for reproduction and $S_3$ denotes a switch for releasing. $Op_1$ to $OP_8$ denote operation amplifying circuits. $COM_1$ to $COM_6$ denote comparing circuits. $AS_1$ to $AS_6$ denote analogue switches. $IA_1$ to $IA_3$ denote constant current circuits. $R_1$ to $R_{16}$ denote resistors. $AG_1$ to $AG_6$ denote AND gate circuits. OG denotes an OR gate circuit. $I_1$ to $I_7$ denote inverter circuits. OS denotes a clock oscillating circuit. SR denotes a shift register circuit. BA denotes a buffer amplifying circuit. MF denotes an electromagnetic coil for controlling the diaphragm and MS denotes an electromagnetic coil for controlling the shutter.

The operation of this circuit shall be explained in the following.

When a current source switch not illustrated is closed in the initial stage of the releasing operation, an electric voltage will be fed to the entire circuit, an electric current will flow to the electromagnetic coil MS and a shutter blade closing controlling member will be electromagnetically restricted. Further, the photodiode $D_1$ will receive the light from the object to be photographed having passed through the mounted lens in the maximum diaphragm aperture and will generate an electric current $I_p$ corresponding to it. (The permeation rate of a light measuring optical system set behind the mounted lens is constant irrespective of the kind of the mounted lens and shall be omitted.) As the operation amplifying circuit $OP_1$ has the photodiode $D_1$ connected between both input terminals and has the logarithmic compression diode $D_2$ connected between an output terminal and reversed input terminal, a voltage $(Bv - Avo)$ determined in response to the brightness $Bv$ of the object to be photographed and the F-number of the mounted lens will be generated at the output terminal. Further, at the point a in FIG. 2, by the relation between the constant current and the variable resistors $VR_1$ and $VR_2$, a voltage $(Sv + Avo)$ determined in response to the film sensitivity value $Sv$ and the F-number $Avo$ of the mounted lens will be generated and will appear at the output terminal of the operation amplifying circuit $OP_2$. As the output terminals of the operation amplifying circuits $OP_1$ and $OP_2$ are connected to the reversing input terminal of the operation amplifying circuit $OP_3$ respectively through the resistors $R_1$ to $R_2$ and the output terminal of the circuit $OP_3$ is returned and connected to the reversing input terminal through the resistor $R_3$, the output voltages of the operation amplifying circuits $OP_1$ and $OP_2$ will be added to the output terminal of the operation amplifying circuit $OP_3$ and will appear as reversed. That is to say, $$-(Bv-Avo+Sv+Avo) = -(Bv+sv) = -Ev.$$

This voltage will be given to the capacitor $C_1$ through the switch $S_1$ always closed except at the time of the photographing operation, will always follow the variation of the light from the object to be photographed and will be rewritten in response to the exposure value $Ev$. When the releasing operation thus further progresses, the switches $S_1$ and $S_3$ will be opened, the voltage just before it will be memorized in the capacitor $C_1$ and will be held as an output voltage of the operation amplifying circuit $OP_4$ having a high input impedance. As the output terminal of this operation amplifying circuit $OP_4$ is connected on one hand to the reversing input terminal of the operation amplifying circuit $OP_5$ through the resistor $R_4$ and the output terinal of the operation amplifying circuit $OP_5$ is returned and connected to the reversing input terminal through the resistor $R_5$, the output voltage $-Ev$ of the operation amplifying circuit $OP_4$ will appear as reversed $Ev$ at the output terminal of the operation amplifying circuit $OP_5$ and will be given to the respective non-reversing input terminals of the comparing circuits $COM_1$ to $COM_4$ forming a voltage detector. On the other hand, the voltages $E_1$ to $E_4$ determined by the constant current and resistors $R_6$ to $R_9$ will be given to the respective reversing input terminals of the comparing circuits $COM_1$ to $COM_4$. These voltages $E_1$ to $E_4$ are set in steps and serve to divide the exposure zone into five stages $Ev_1$ to $Ev_5$. That is to say, to what zone the exposure value $Ev$ operated by measuring the light belongs is discriminated by the comparing circuits $COM_1$ to $COM_4$. That is to say, when the voltages $E_1$ to $E_4$ are respectively of threshold values and the exposure value $Ev$ is $Ev < E_1$, the outputs of the comparing circuits $COM_1$ to $COM_4$ will be all on the "L" level and the AND gate circuits $AG_1$ to $AG_4$ will close. When $E_1 < Ev < E_2$, only the output of the comparing circuit $COM_1$ will be on the "H" level, only AND gate circuit $AG_1$ will be able to be opened. When $E_2 < Ev < E_3$, the outputs of the comparing circuits $COM_1$ and $COM_2$ will be on the "H" level and the AND gate circuits $AG_1$ and $AG_2$ will be able to be opened. Further, when $E_3 < Ev < E_4$, the AND gate circuits $AG_1$ to $AG_3$ will be able to be opened. When $E_4 < Ev$, all of the AND gate $AG_1$ to $AG_4$ will be able to be opened. On the other hand, when the switch $S_3$ is opened, the clock oscillating circuit OS will begin to oscillate and the shift register circuit SR will release the resetting signal through the inverter circuit $I_1$. In this initial state, the output terminal $Q_6$ of the shift register circuit SR will be on the "L" level, the input voltage on one side of the AND gate circuit $AG_6$ will be on the "H" level through the inverter circuit $I_2$, therefore the clock pulse of the clock oscillating circuit OS will pass through the AND gate circuit $AG_6$ and will be given to the shift register circuit SR and, at each rise of the clock pulse, the "H" level state will move in turn toward the output terminal $Q_6$ from the output terminal $Q_1$. By the way, when the output terminal $Q_6$ reverses to the "H" level, the AND gate circuit $AG_6$ will be closed through the inverter circuit $I_2$ and therefore the subsequent input of the clock pulse into the shift register circuit SR will be prohibited. As the respective output terminals of the AND gate circuits $AG_1$ to $AG_4$ are connected to the input terminal of the OR gate circuit OR, the AND gate circuit $AG_5$ has the output terminal of the OR gate circuit OR connected to one input terminal and has the clock pulse from the clock oscillating circuit OS put into the other input terminal, depending on the opening of the AND gate circuits $AG_1$ to $AG_4$ and the movement of the output in the shift register circuit SR, a predetermined number of pulses will be generated at the output terminal d of the AND gate circuit $AG_5$. That is to say, in case $Ev < E_1$, only when the output terminal $Q_1$ of the shift register circuit SR is reversed to the "H" level, a pulse will be generated and, as a result, one pulse will be generated. In case $E_1 < Ev < E_2$, whenever the output terminals $Q_1$ and $Q_2$ of the shift register circuit SR are reversed to the "H" lever, pulses will be generated and, after all, two pulses will be generated. Then, in the same manner, the number of pulses will increase to be 3, 4 and 5. In response to the number of pulses generated at the output terminal of this AND gate circuit $AG_5$, the electromagnetic coil MF will be intermittently driven through the buffer amplifying circuit BA and, as described later, the diaphragm aperture will be determined in response to the exposure zone. Further, the analogue switches $AS_1$ to $AS_4$ will be on when the outputs of the inverter circuits $I_3$ to $I_6$ for reversing the output levels of the comparing circuits $COM_1$ to $COM_4$ determining the diaphragm aperture in response to the exposure zone are placed on the "H" level. That is to say, voltages $(Avx; Av_1$ to $Av_5)$ determined by the constant current, resistors $R_{10}$ to $R_{14}$ and switching on and off of the analogue switches $AS_1$ to $AS_4$ corresponding to the determined diaphragm aperture $Av$ are given to the reversing input terminal of the comparing circuit $COM_5$. Further, the voltage $Avo$ corresponding to the F-number of the mounted lens is given to the non-reversing input terminal of the comparing circuit $COM_5$ through the operation amplifying circuit $OP_6$. By the way, the output terminal of the operation amplifying circuit $OP_4$ is connected to the reversing input terminal of the operation amplifying circuit $OP_7$ through the resistor $R_{15}$. Therefore, in case the determined diaphragm aperture is larger than the maximum diaphragm aperture of the mounted lens, that is to say, in case $Av>Avo$, the output of the comparing circuit $COM_5$ will be on the "H" level, the analogue switch $AS_5$ will be off and the analogue switch $AS_6$ will be on through the inverter circuit $I_7$. Therefore, the voltage Av corresponding to the determined diaphragm aperture will be given through the resistor $R_{16}$ to the reversing input terminal of the operation amplifying circuit $OP_7$. On the contrary, in case the determined diaphragm aperture is smaller than the maximum diaphragm aperture of the mounted lens, that is, in case $Av<Avo$, the analogue switch $AS_5$ will be on, the analogue switch $AS_6$ will be off and the voltage Avo corresponding to the maximum diaphragm aperture of the mounted lens will be given to the reversing input terminal of the operation amplifying circuit $OP_7$. As a result, the reversed sum of both input voltages, that is, the voltage of $-(-Ev+Av)=Ev-Av$ or $-(-Ev+Avo)=Ev-Avo$ will appear at the output of the operation amplifying circuit $OP_7$ and will be a voltage corresponding to the exposure time Tv. This voltage is given to the reversing input terminal of the operation amplifying circuit $OP_8$ through the diode $D_3$ and the output of the operation amplifying circuit $OP_8$ is returned to the reversing input terminal through the switch $S_2$ and capacitor $C_2$. Therefore, the current $IA_4$ flowing into the diode $D_3$ will be a current corresponding to the logarithmically extended exposure time T and will be fed to the capacitor $C_2$. Therefore, when the switch $S_2$ is opened in response to the opening of the shutter blades after the later detailed determination of the diaphragm aperture, the capacitor $C_2$ will be charged with the current $IA_4$ and the output voltage of the operation amplifying circuit $OP_8$ will vary in response to $(IA_4/C_2)t$. Therefore, when the voltage given to the reversing input terminal reaches the reference input voltage Vref given to the non-reversing input terminal, the output of the comparing circuit $COM_6$ will reverse to the "H" level, the current passed to the electromagnetic coil MS will be interrupted and the shutter blades will be closed.

Now, the diaphragm controlling mechanism shall be explained in the following with reference to FIG. 4.

Reference numeral 1 denotes a diaphragm controlling electromagnet formed of the above described coil MF and an iron core 1a, permanent magnet 1b and short-circuiting plate 1c. 2 denotes an armature lever pivoted to a shaft 3, biased counterclockwise by a spring 4 and formed of an arm part 2a and cam face 2b. 5 denotes an armature pivoted on the armature lever 2 and arranged as opposed to the iron core 1a of the electromagnet 1. 6 denotes a pawl lever pivoted to the shaft 3 and forming a pawl part 6a and a step part 6b engaging with the arm part 2a of the armature lever 2. 7 denotes a spring connecting the armature lever and pawl lever with each other. 8 denotes a diaphragm setting member set movably rightward and leftward, biased rightward by a spring 9, forming hook parts 8a to 8e engageable with the pawl part 6a of the pawl lever 6, projections 8f to 8i engageable with the cam face 2b of the armature lever 2 and an arm part 8j and provided with a pin 8k. 10 denotes a fixed pin located within the track of the motion of the arm part 8j to limit the rightward movement of the diaphragm setting member 8. 11 denotes an inhibiting lever pivoted on the diaphragm setting member 8, biased counterclockwise by a spring 12 and forming an arm part 11a. 13 denotes a mirror lever forming a part of a mirror mechanism not illustrated, arranged movably vertically (as indicated by the arrow) and biased downward by a spring 14. 15 denotes a mirror operating lever pivoted to a shaft 16 and forming arm parts 15a and 15b and a hook part 15c. 17 denotes a locking lever pivoted to a shaft 18, biased clockwise by a spring 19, forming a hook 17a engageable with the hook part 15c of the mirror operating lever 15 and engageable on the side surface with the arm part 11a of the inhibiting lever 11. 20 denotes a mirror setting lever pivoted to the shaft 16, biased clockwise (as indicated by the arrow) by a spring not illustrated, forming arms 20a and 20b and provided with a pin 20c engageable with the mirror operating lever 15. 21 denotes a spring hung between the mirror operating lever 15 and mirror setting lever 20 and acting as a force counterclockwise biasing the mirror operating lever 15. 22 denotes a returning lever pivoted to a shaft 23, forming a slot 22a fitting the pin 8k of the diaphragm setting member 8 and made to be pushed by the arm part 15b of the mirror operating lever 15. 24 denotes a closing signal lever pivoted to a shaft 25, biased clockwise by a spring 26, forming a hook 24a engageable with the arm 20a of the mirror setting lever 20 and made to rotate counterclockwise when shutter blades not illustrated are closed. The above are component parts arranged on the camera body side. 27 denotes a diaphragm setting member arranged on the interchangeable lens side not illustrated, forming an arm part 27a to be engaged with the arm part 8j of the diaphragm setting member 8 on the camera body side and biased rightward by a spring 28.

Here, the camera related with the present invention and the interchangeable lens diaphragm controlling mechanism shall be described.

First of all, the diaphragm setting member on the camera body side is made to be able to move by a determined amount so as to be able to control the diaphragm aperture of the interchangeable lens group mounted on the camera from the maximum to the minimum. Also, the diaphragm setting member 27 provided in each interchangeable lens is made movable by the same amount as the diaphragm setting member on the camera side irrespective of each F-number. When the lens to be used is mounted on the camera, the diaphragm setting member 27 will engage with the diaphragm setting member 8 positioned in the maximum aperture position and the diaphragm blades will be placed in the fully opened position. When the diaphragm setting member 8 moves toward the minimum diaphragm aperture position from the maximum aperture position, the diaphragm setting member 27 will immediately follow it to move toward the minimum diaphragm aperture position from the maximum aperture position but the time when the diaphragm blades actually begin to move to the set diaphragm aperture position will be after the diaphragm setting member reaches the maximum diaphragm aperture positon of the lens itself being in use.

The operation of the mechanism shown in FIG. 4 shall be explained in the following.

Figure 3:
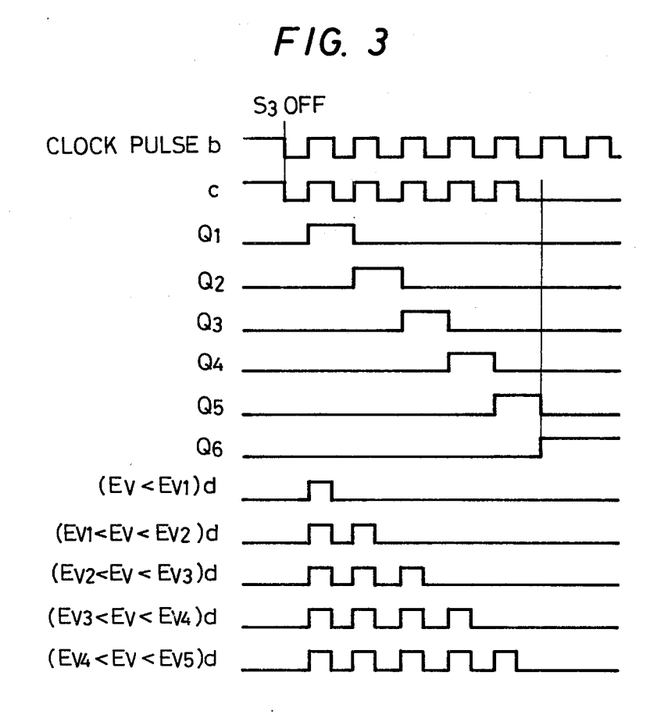
FIG. 3 is an explanatory view for explaining the generation of diaphragm controlling pulses.

As described above, when the switch $S_3$ is opened and the output $Q_1$ of the shift register circuit SR is turned to the "H" level, the output of the AND gate circuit $AG_5$ will always generate one pulse signal. As a result, an electric current will flow to the coil MF and a magnetic field in the direction of canceling the magnetic force of the permanent magnet 1b will be generated in the iron core 1a. Therefore, the armature lever 12 will be rotated counterclockwise together with the pawl lever 6 by the tension of the spring 4. At the time, the pawl part 6a of the pawl lever 6 will be disengaged from the first hook 8a of the diaphragm setting member 8 and therefore this setting member 8 will move rightward due to the tension of the spring 9. When the armature lever 2 rotates counterclockwise, the cam face 2b will be located within the track of the motion of the projection 8f, the projection 8f will push the cam face 2b to rotate the armature lever 2 clockwise against the tension of the spring 4, the armature 5 will be attracted by the magnetic force of the permanent magnet 1b (at this time, the magnetic field by the coil MF will have been already extinguished), the armature lever 2 and pawl lever 6 will return to the illustrated positions and therefore the movement of the setting member 8 will be once stopped when the second hook 8b contacts the pawl part 6a. As the inhibiting lever 11 is rotated clockwise by the rightward movement of the diaphragm setting member, the locking lever 17 will be rotated clockwise by the tension of the spring 19 and the hook 17a will be disengaged from the hook part 15c. As a result, the mirror operating lever 15 will be rotated counterclockwise by the tension of the spring 21 and the mirror lever 13 will be raised by the arm part 15a against the tension of the spring 14 to raise a mirror not illustrated. On the other hand, the arm part 27a will follow the displacement of the arm part 8j by the rightward movement of the diaphragm setting member 8 and the diaphragm setting member 27 on the lens side will be also moved rightward by the tension of the spring 28. Further, the number of times by which the coil MF is intermittently energized will be determined by the zone to which the voltage Ev obtained by measuring the light of the field to be photographed in the fully opened state of the diaphragm of the mounted lens and operating it belongs as shown in FIG. 3. In response to the number of times, the intermittent rightward moving operation of the above described diaphragm setting member 8 will be repeated. In response to it, the displacement of the diaphragm setting member 27 will be determined.

Figure 5:
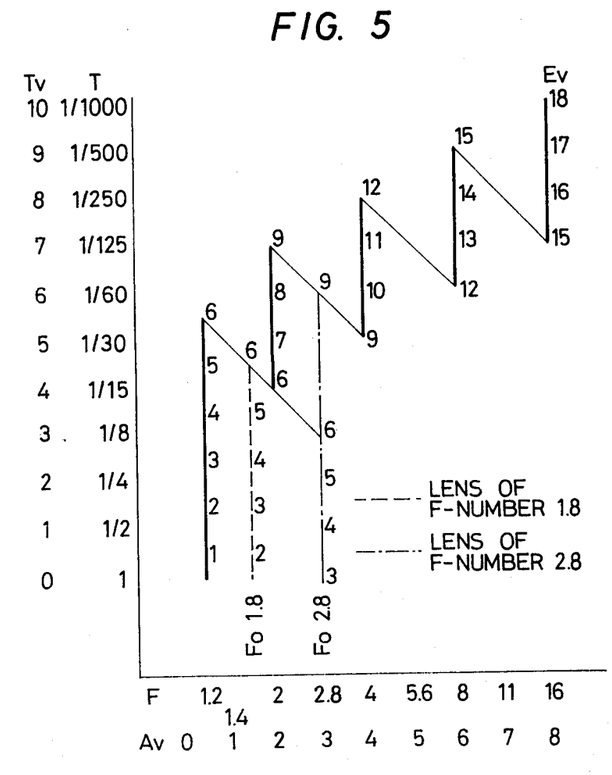
FIG. 5 is a program diagram determined by a combination of a diaphragm value and shutter speed; and FIG, 6 is an explanatory view showing a utilizing example different from that of FIG. 4 of the diaphragm controlling mechanism shown in FIG. 4.

Now, with reference to FIG. 5, a diaphragm control and an example of program of an exposure time corresponding to it shall be explained in the following.

The exposure zone is divided into five stages of exposure values Ev of 18 to 15, 15 to 12, 12 to 9, 9 to 6 and not more than 6 and the displacement of the diaphragm setting member 27 is kept to be selected so that the diaphragm values may be set to be F:16 for the exposure values Ev of 18 to 15 and respectively steppedly F:8, 4, 2 and 1.2 for the exposure values Ev of 15 to 12, 12 to 9, 9 to 6 and 6 to 1. For example, if the F-number of the maximum aperture of the interchangeable lens mounted on the camera is 1.2 and the F-number of the minimum diaphragm aperture is 16, at the output terminal of the AND gate circuit AG₅, one pulse will be generated in the zone of the exposure value Ev of not more than 6 and then up to 5 pulses will be generated in turn. In case the exposure value Ev when the light of the field to be photographed is measured and operated by mounting a lens of an F-number of 1.8 belongs to the zone of not more than 6, only one pulse will be generated, the diaphragm setting member 27 will be moved only to the position to set a diaphragm aperture of F:1.2, the diaphragm aperture will be placed in the state of F:1.8 and the exposure time will not be less than about 1/23 second and, in case it belongs to the zone of Ev 12 to 9, three pulses will be generated, the diaphragm setting member 27 will be moved to the position to set a diaphragm aperture of F:4, the diaphragm aperture will be set at F:4 and the exposure time will be controlled to be in the range of 1/250 to 1/30 second. In case the exposure value Ev when the light of the object to be photographed is measured and operated by mounting a lens of an F-number of 2.8 belongs to the zone of 9 to 6 or not more than 6, two or one pulse will be intermittently fed rightward twice or once to enable to set a diaphragm aperture of F:1.2 or F:2 but the diaphragm aperture will remain to be of F:2.8 and the exposure time will be in the range of 1/60 to ⅛ second or not less than ⅛ second and, in case it belongs to the zone of Ev 15 to 12, four pulses will be generated, the diaphragm setting member 27 will be intermittently fed four times, to enable to set a diaphragm aperture of F:8 the diaphragm aperture will be set to be of F:8 and the exposure time will be controlled to be in the range of 1/500 to 1/60 second.

After the diaphragm aperture is thus controlled and the mirror is raised, in order to make an exposure, the shutter blades will be released and the switch S₂ will be opened as operatively connected with them. After the lapse of a predetermined time, when the current passed to the coil MS is interrupted, the shutter blades will be closed and, as operatively connected with this closing operation, the closing signal lever 24 will be rotated counterclockwise against the tension of the spring 26 and the hook 24a will be disengaged from the arm part 20a. As a result, the mirror setting lever 20 will be rotated clockwise by the tension of a spring not illustrated and the mirror operating lever 15 will be pushed to be also rotated clockwise by the pin 20c. Following the clockwise rotation of the mirror operating lever 15, the mirror lever 13 will be lowered by the tension of the spring 14 to lower the mirror. Further, due to the clockwise rotation of the operating lever 15, the returning lever 22 will be pushed to be rotated clockwise by the arm 15b and therefore the diaphragm setting member 8 will be moved leftward against the tension of the spring 9. The leftward motion of the diaphragm setting member 8 will result in that, in the process, the back surfaces of the hooks 8e to 8a will contact the back surface of the pawl part 6a of the pawl lever 6 so as to be braked in turn. Therefore, the shock when the pin 20c of the mirror setting lever 20 engages with the mirror operating lever 15 will be reduced. With the return of the diaphragm setting member 27 will be also returned to the illustrated position, the diaphragm blades will be fully opened and the locking lever 17 will be pushed by the inhibiting lever 11 so as to be rotated counterclockwise to the illustrated position. The mirror operating lever 15 will be placed in a position somewhat rotated clockwise from the illustrated position by the clockwise rotation of the mirror setting lever 20. However, when this setting lever 20 is rotated counterclockwise through the arm part 20b as operatively connected with the film winding operation, the hook part 15c will follow to be engaged with the hook 17a of the locking lever 17 so as to be in the illustrated state. Further, when the arm part 20a is engaged with the hook 24a of the closing signal lever 24 by the film winding operation the mirror setting lever 20 will return to the illustrated state. By the way, in the embodiment in FIG. 4, the diaphragm setting member 27 is so formed as to follow the diaphragm setting member 8. However, there can be made a formation wherein the diaphragm setting member 27 is biased leftward and, as shown by the chain line in FIG. 4, the arm part 27a is made to be engaged on the right side of the arm part 8j of the diaphragm setting member 8 so that the diaphragm setting member 27 may be pushed by the diaphragm setting member 8. Further, an attracting type electromagnet, electromagnetic plunger or rotary solenoid can be utilized for the electromagnetic device instead of such released type electromagnet combined with a permanent magnet as is shown in the embodiment.

Figure 4:
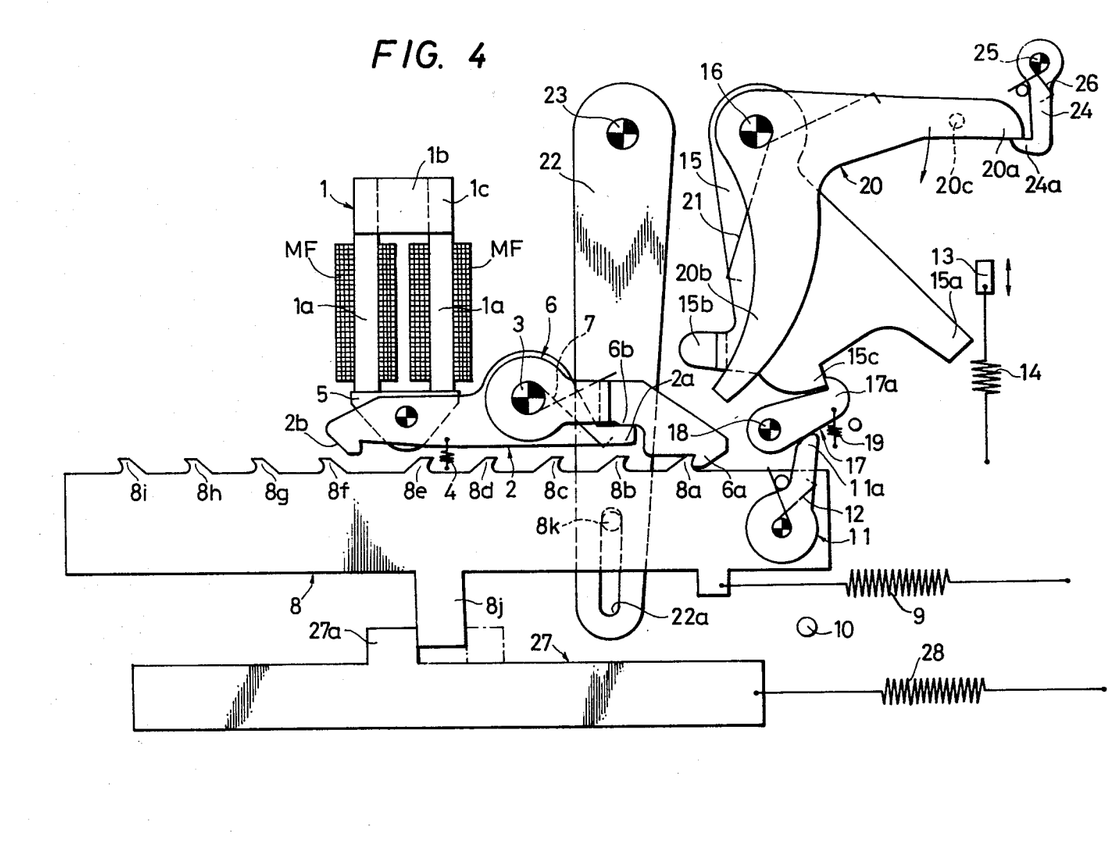
FIG. 4 is an explanatory view showing an embodiment of the diaphragm controlling mechanism according to the present invention.
Figure 6:
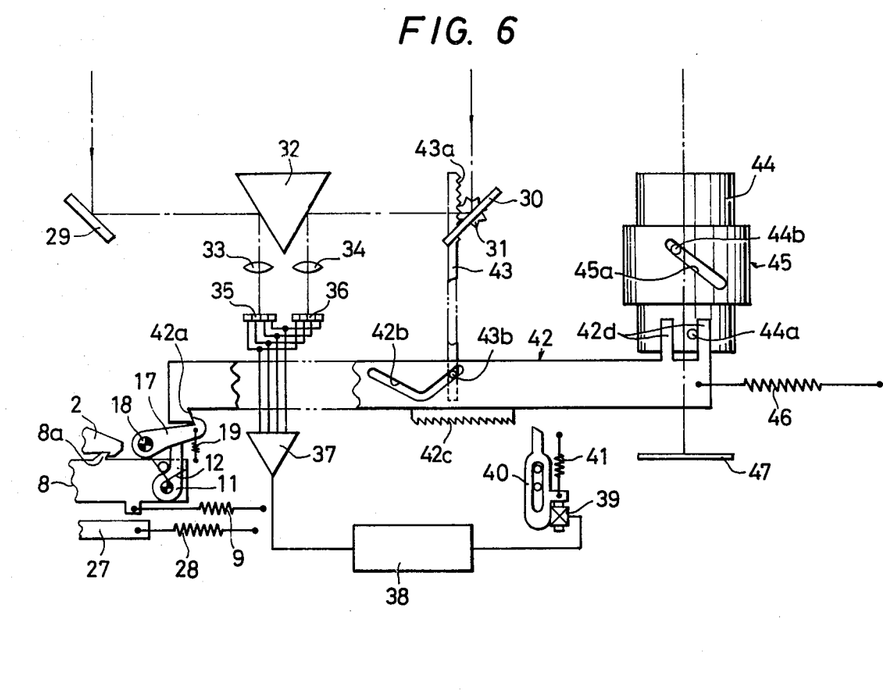

FIG. 4 shows an embodiment in which the diaphragm controlling mechanism is related with the mirror mechanism. However, FIG. 6 shows an embodiment in which this diaphragm controlling mechanism is related with an automatic focus adjusting mechanism. In FIG. 6, reference numeral 29 denotes a fixed mirror, 30 denotes a movable mirror fixed on a gear 31, 32 denotes a surface reflecting prism, 33 and 34 denote image focusing lenses, 35 and 36 denote light receiving elements respectively divided into several sections, 37 denotes an adding operation circuit having the outputs from the light receiving elements 35 and 36 as inputs, 38 denotes a controlling circuit which can control the current passed to a solenoid 39 by the state of the output from the adding operation circuit 37, 40 denotes an obstructing pawl which is biased upward by a spring 41 and can be held in the illustrated position while the solenoid 39 is energized, 42 denotes a scanning controlling plate which is supported slidably in the lateral direction and has a hook part 42a engageable with the locking lever 17, a V-shaped cam slot 42b a serrated part 42c engageable with the obstructing pawl 40 and forked part 42d, 43 denotes an operatively connecting rod which is supported movably in the vertical direction and has a rack part 43a meshing with the gear 31 and a pin 43b slidably fitted in the cam slot 42b, 44 denotes a lens barrel which has a pin 44a engageable with the forked part 42d of the scanning controlling plate 42 and another pin 44b, 45 denotes a fixed barrel which supports the lens barrel 44 slidably and rotatably and has a cam slot 45a slidably fitted to the pin 44b, 46 denotes a spring biasing the scanning controlling plate 42 rightward and 47 denotes a film.

The illustrated state shows the film as wound up. However, in this state, hook part 42a is engaged with the locking lever 17, the pin 43b of the operatively connecting rod 43 is positioned at the right end of the cam slot 42b, the obstructing pawl 40 is attracted by the solenoid 39 and is held in a position not meshing with the serrated part 42c and the pin 44a of the lens barrel 44 is in contact with the right side part of the forked part 42d. When the releasing button of the camera is pushed in this state, first the diaphragm setting member 8 will be moved rightward to determine the diaphragm aperture of the photographing lens as already explained but the locking lever 17 will be disengaged from the hook part 42a by the initial movement. Therefore, the scanning controlling plate 42 will be moved rightward by the spring 46 but, in the process of this movement of the scanning controlling plate 42, the focus adjustment of the photographing lens will be automatically made. That is to say, with the rightward movement of the scanning controlling plate 42, first the operatively connecting rod 43 will lower, the movable mirror 30 will scan the field to be photographed from the infinitely far position to the nearest position and the photoelectric signal value at the scanning point of the main object to be photographed will be memorized within the controlling circuit 38. When the operatively connecting rod 43 thus reaches the lowermost position, the left side part of the scanning controlling plate 42 will contact the pin 44a of the lens barrel 44. At this time, the serrated part 42c will reach the position engageable with the obstructing pawl 40. With the further rightward movement of the scanning controlling plate 42, the operatively connecting rod 43 will be again raised, therefore the movable mirror 30 will be rotated toward the infinitely far position from the nearest distance position, at the same time, the lens barrel 44 will be also lowered while rotating clockwise and the object to be photographed in the nearest distance position to the object to be photographed in the farther position will be made images focused in turn on the film. When the movable mirror 30 again scans the main object to be photographed and the photoelectric signal from the adding operation circuit 37 coincides with the already memorized photoelectric signal value, the current fed to the solenoid 39 will be interrupted. Therefore, at this moment, the obstructing pawl 40 will be raised by the spring 41 to engage with the serrated part 42c, the rightward movement of the scanning controlling plate 42 will be stopped and thus the automatic focus adjusting operation will end. The operation of the exposure controlling device thereafter is as already explained and shall not be explained again. With the film winding operation, the scanning controlling plate 42 will be moved leftward against the spring 46 and will be locked again in the illustrated position by the locking lever 17. In such case, the light receiving element $D_1$ for the program control can be arranged in the position corresponding to a focus detecting face (for example, the position of the light receiving element 35) or can be simultaneously the light receiving element 35.

I claim:

1. An exposure controlling device for use with cameras using interchangeable lenses having respectively predetermined F-numbers comprising:

a first means for determining an exposure value for a field of view to be photographed by measuring the light from the field of view after that light has passed through a photographing lens having a fully opened diaphragm aperture, a second means connected to said first means for establishing a plurality of predetermined exposure zones and determining to which one of these exposure zones said exposure value belongs, the second means including a plurality of comparing circuits each having a first input terminal connected to said first means and a second input terminal respectively connected to one of a plurality of reference voltage sources each providing a different voltage, only one of said comparing circuits containing within its range a voltage corresponding to an exposure value determined by said first means thereby determining an exposure zone, a third means connected to said second means for determining a diaphragm value for said photographing lens in response to the exposure zone determined by said second means, the third means including a plurality of gate circuits each one having a first input terminal respectively connected to an output terminal of its respective comparing circuit and a second input terminal respectively connected to one of a plurality of pulse generating circuits providing a predetermined number of pulses per unit time, only said gate circuit connected to said operated comparing circuit being operated to pass a corresponding number of pulses to a diaphragm control element thereby to determine a diaphragm aperture corresponding to said discriminated exposure zone, and a fourth means connected to said second means for determining an exposure time by comparing said diaphragm value determined in response to the exposure zone with the F-number of said photographing lens, the exposure time being determined (a) from said exposure value and diaphragm value when said diaphragm value is larger than said F-number and (b) from said exposure value and said F-number when said diaphragm value is smaller than said F-number.

2. An arrangement for controlling the exposure of a camera operable with interchangeable lenses, comprising:

first means for measuring light from a field to be photographed after that light has passed through a lens of the camera operated at full-open aperture;

second means for manually inputting (a) a value representing the sensitivity of a film being used in the camera and (b) a value representing the open aperture F-stop (speed) of the lens, and storing these values;

third means, responsive to the first and second means for determining an exposure value corresponding to the field to be photographed;

fourth means for classifying the exposure value determined by the third means into one of a plurality of pre-established exposure value ranges the fourth means including a plurality of comparing circuits, each having a first input terminal connected to said first means and a second input terminal respectively connected to one of a plurality of reference voltage sources each providing a different voltage, only one of said comparing circuits containing within its range a voltage corresponding to an exposure value determined by said first means thereby determining an exposure zone;

fifth means for assigning, in accordance with the range into which the exposure value is classified, a diaphragm value (lens stop) to which the lens is to be set for photographing the field, the fifth means including a plurality of gate circuits each having a first input terminal connected to an output terminal of its corresponding comparing circuits and a second input terminal respectively connected to one of a plurality of pulse generating circuits providing a predetermined number of pulses per unit time, only said gate circuit connected to said operated comparing circuit being operated to pass a corresponding number of pulses to a diaphragm control element to determine a diaphragm aperture corresponding to said discriminated exposure zone;

sixth means for determining from (a) the exposure value determined by the third means and (b) the diaphragm value assigned, an exposure time during which the shutter of the camera is to be open for photographing the field.

3. An arrangement according to claim 2 wherein the fifth means includes means for generating a pulse signal indicative of the diaphragm value assigned, the arrangement further including means, responsive to the pulse signal, for controlling the diaphragm of the lens and a shift register having an input terminal connected to said pulse generating means and a plurality of output terminals connected respectively to said input terminals of said gate circuits to input a corresponding number of pulses into said gate circuits responsive to the output level from said shift register shifting in response to each pulse.

* * * * *